UNITED STATES PATENT OFFICE.

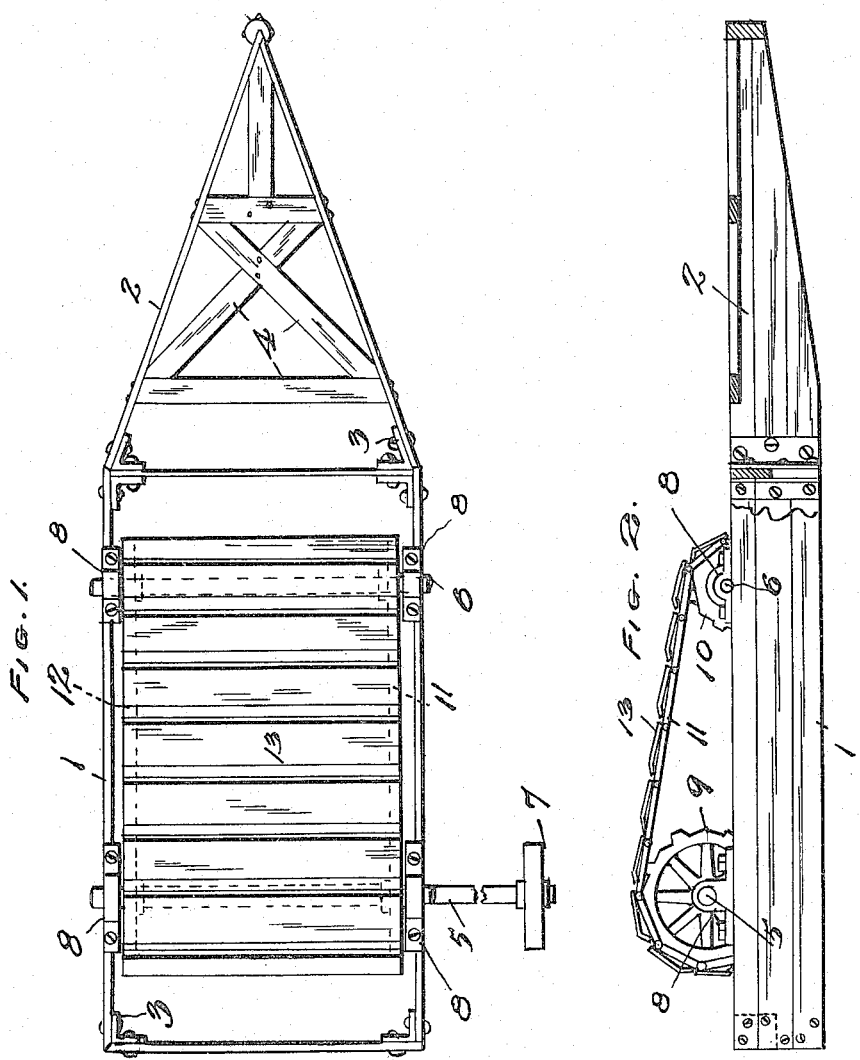

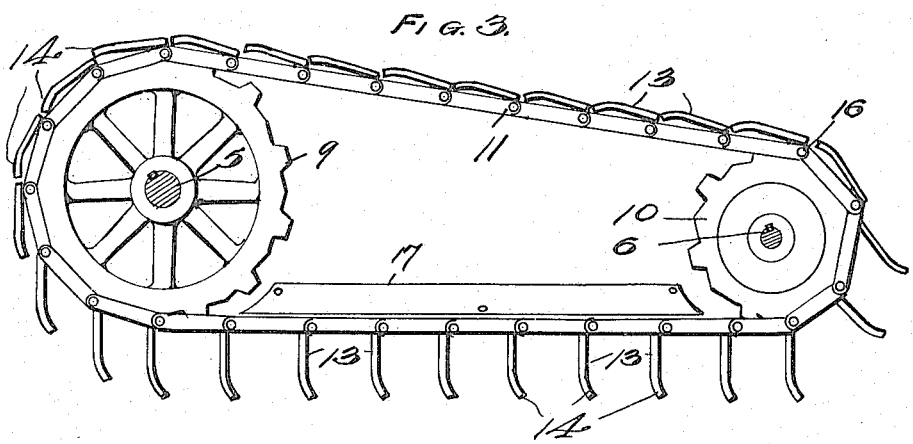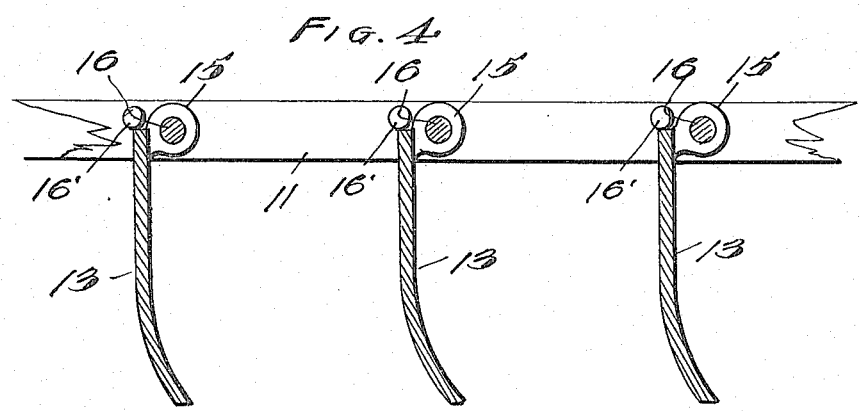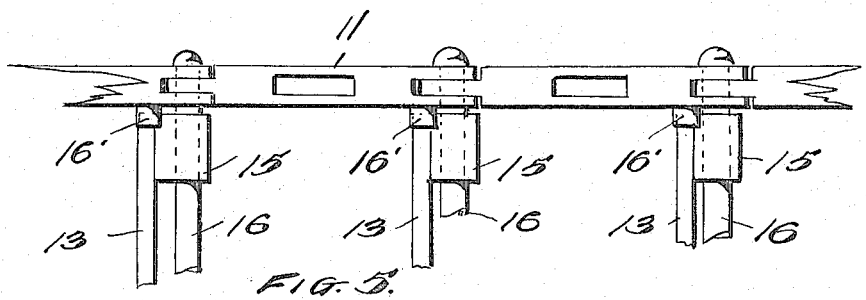

JOHN HAWLEY, OF GREEN RIVER, WYOMING.

WATER-MOTOR.

1,143,905.   Specification of Letters Patent.   Patented June 22, 1915.

Application filed March 23, 1914. Serial No. 826,681.

*To all whom it may concern:*

Be it known that I, JOHN HAWLEY, a citizen of the United States of America, residing at Green River, in the county of Sweetwater and State of Wyoming, have invented certain new and useful Improvements in Water-Motors, of which the following is a specification.

The present invention relates to improvements in water motors and is designed to provide a motor of this type which is applicable for use in connection with the operations of pumps, machinery etc.

The primary object of the invention is to simplify the construction and operation of that type of water motor which is operated by the passing or flowing currents in a stream, and to reduce the original cost and also the cost of maintenance of these devices as a result of this simplification of parts.

The invention consists essentially in certain novel combinations and arrangements of parts as hereinafter set forth and claimed.

In the accompanying drawings I have illustrated a complete example of the physical embodiment of my invention constructed according to the best mode I have so far devised for the practical application of the principles of my invention.

Figure 1 is a plan view of the water motor, complete, embodying my invention. Fig. 2 is a side elevation of Fig. 1, with parts broken away for convenience of illustration. Fig. 3 is an enlarged view of the operating parts of the motor. Fig. 4 is a sectional detail elevation showing the means for holding the blades or paddles in operative position. Fig. 5 is a plan view of Fig. 4 illustrating the construction of sprocket chain and paddles.

In the preferred embodiment of my invention as illustrated in the drawings I have shown a floating type of motor, designed to float upon the surface of the stream, but with the paddles, when in operative position, submerged.

The supporting or floating frame is somewhat similar in outline to a boat structure comprising a rectangular body portion 1 and a pointed prow 2, the parts being jointed by angle plates 3 and braces 4. The frame may be of suitable construction and material, but of course is open to the passing currents and to accommodate the paddles of the motor, when they are in operative position.

The motor is supported on the frame 1 by means of the two shafts 5 and 6, the former being the shaft for transmitting power and being equipped with a wheel 7 for this purpose. The shafts are journaled in bearings 8, 8, 8, 8, and extend across the top of the frame 1, each to support its pair of sprocket wheels as 9, 10. These wheels are fixed to the shafts and are located adjacent the bearings 8, and are adapted to move the endless sprocket chains 11 and 12 which pass over the wheels and support the paddles 13.

The paddles 13 are of suitable dimensions, material, and construction, but are preferably formed with a bent end 14 to receive impact from the currents of water and derive pressure therefrom as they are moving into and out of operative position, and also when in positions intermediate of the ends of the motor.

The paddles are each provided with end sleeves 15, and by means of these sleeves each paddle is suspended and free to swing on the cross bars 16 which extend transversely of the motor from sprocket chain 11 to chain 12 and form the pivots of the links of these chains. Adjacent each sleeve a lug or pin 16' is located and these lugs or pins are fixed in the links of the chains. As clearly seen in Figs. 4 and 5 these pins perform the function of stops for the paddles and limit their swinging movement of the paddles in the direction of the movement of the currents of water and chain. A guide board 17 may be employed if found necessary, and this board is suspended between the sides of the motor frame for the chains to bear against and limit the upward movement of these parts when under water pressure.

The operation of the motor will be apparent from an inspection of the drawings and particularly Fig. 3, where it will be seen that the vertically located paddles at the bottom of the motor are in position to receive pressure from passing currents in the stream of water, and in this position the pins 16 form an abutment to receive the pressure against the paddles. The paddles to the right are dropping into position, and the paddles at the left are being lifted upwardly to horizontal position, while the paddles at the top of the motor are lying idle in a horizontal position between the two chains. The power generated is transmitted through the wheel 7 and is used as desired.

The float is anchored in proper position in a stream or flowing current of water and the float draws water to a sufficient depth to insure that the paddles on the bottom of the motor are entirely submerged, so that the passing currents of water as they impact on the vertically standing paddles will actuate the chains, shafts, and wheels to transmit motion to the place for use.

From the above description taken in connection with my drawings it is evident that I have provided a device which fulfils the conditions set forth as the objects of my invention.

Having thus fully described my invention, what I claim as new and desire to secure by Letters Patent:—

The combination in a water motor including a pair of spaced endless chains, of transverse pivot bars connecting said chains, paddles having sleeves rotatable on said bars, and pins in said chains adapted to engage the back edges of the paddles to limit their movement and hold them in operative position.

In testimony whereof I affix my signature in presence of two witnesses.

JOHN HAWLEY.

Witnesses:
 TOM WHITMORE,
 J. W. HAWK.

Copies of this patent may be obtained for five cents each, by addressing the "Commissioner of Patents, Washington, D. C."